United States Patent
Piasentin (10) Patent No.: US 12,090,597 B2
(45) Date of Patent: Sep. 17, 2024

(54) MACHINING CENTER EQUIPPED WITH DEVICE FOR MOUNTING ON A CLAMP PARTS OR PROFILES TO BE WORKED

(71) Applicant: PROQUADRO S.R.L., Pordenone (IT)

(72) Inventor: Mirko Piasentin, Colle Umberto (IT)

(73) Assignee: TECNO LOGICA S.R.L., Spresiano (IT)

( * ) Notice: Subject to any disclaimer, the term of this patent is extended or adjusted under 35 U.S.C. 154(b) by 529 days.

(21) Appl. No.: 17/429,699

(22) PCT Filed: Feb. 12, 2020

(86) PCT No.: PCT/IB2020/051122
§ 371 (c)(1),
(2) Date: Aug. 10, 2021

(87) PCT Pub. No.: WO2020/165784
PCT Pub. Date: Aug. 20, 2020

(65) Prior Publication Data
US 2022/0152764 A1    May 19, 2022

(30) Foreign Application Priority Data
Feb. 13, 2019   (IT) .......................... 102019000002059

(51) Int. Cl.
*B23Q 7/04*      (2006.01)
*B23Q 39/04*     (2006.01)

(52) U.S. Cl.
CPC ............. *B23Q 7/047* (2013.01); *B23Q 7/043* (2013.01); *B23Q 7/046* (2013.01); *B23Q 39/046* (2013.01); *B23Q 2240/007* (2013.01)

(58) Field of Classification Search
CPC .............................. B23Q 39/046; B23Q 7/047
See application file for complete search history.

(56) References Cited

U.S. PATENT DOCUMENTS 5,781,983 A * 7/1998 Gruner ................. B23Q 7/1494
                                                      409/164
8,529,419 B2 * 9/2013 Kawasumi ............. B23Q 7/045
                                                      29/27 R (Continued)

FOREIGN PATENT DOCUMENTS

CN       105729249 A    7/2016
DE       19835168 C1    3/2000

OTHER PUBLICATIONS

International Search Report and WO dated May 27, 2020 issued in PCT/IB2020/051122.

(Continued)

*Primary Examiner* — Jason L Vaughan
(74) *Attorney, Agent, or Firm* — Rivka Friedman (57) ABSTRACT

A machining center equipped with a device for mounting on a clamp parts to be worked or which have been worked, such as profiles, which has a supporting frame for supporting a turntable with two or more stepped positions or placements or workstations, an loading basket and an unloading basket. The machining center comprises a robot configured to remove or to associate, with each one of said two or more stepped positions or placements or workstations, the parts or the profiles to be worked and which have been worked at a plurality of fixed RPS or reference points and mobile mechanical components, according to a single positioning that is adapted to allow access by machining devices to any zone in the space of the profiles to be worked by modifying only the condition that the two or more stepped positions or placements or workstations are in.

7 Claims, 13 Drawing Sheets

(56) References Cited

U.S. PATENT DOCUMENTS

2015/0276549 A1  10/2015  Lazic et al.
2017/0274553 A1   9/2017  Martinez et al.

OTHER PUBLICATIONS

Italian Search Report and Written Opinion dated Oct. 18, 2019 issued in IT 201900002059, with partial translation.

* cited by examiner

MACHINING CENTER EQUIPPED WITH DEVICE FOR MOUNTING ON A CLAMP PARTS OR PROFILES TO BE WORKED

The present invention relates to a machining center equipped with a device for mounting on a clamp for automatic leveling-off parts to be worked or which have been worked, such as profiles.

Nowadays workstations are known which usually have a supporting structure made of electrowelded metal structural work; a turntable is fixed thereon, for example with four or more stepped positions.

"Placements" are assembled on the turntable, and the number of these placements is dictated by the cycle time.

The operation to load/unload the profiles to be worked and which have been worked is usually carried out by an anthropomorphic robot, on the wrist of which a hand for gripping is mounted which is provided with suckers or pneumatic grippers, the function of which is to pick up the profile to be worked from a loading basket, position it in the placement, exit from the placement in order to allow the turntable to rotate, reenter to pick up the worked profile, and deposit it in an unloading basket.

The unloading and loading baskets are made up of a metal structural frame of fixed dimensions, on which are assembled outlines of stratified material which vary their geometry on the basis of the geometry of the profile that they accommodate.

Between the steps of loading the profiles to be worked and unloading the worked profiles there is the positioning of the profiles to be worked in the placements of the turntable, i.e. on a mounting system.

To this end, for example US2017/0274553A1 is known in which, in order to be able to execute the required machining operations, before a first robot picks up the workpiece, the thickness and the bevel of that workpiece are measured.

The first robot is configured to separately immobilize a workpiece, which is oriented horizontally; after that the workpiece is immobilized and removed by a transfer conveyor from the first robot, which is configured to reorient the workpiece in a vertical position in which the opposite ends of the workpiece are directed upward and downward, respectively, and the main opposing surfaces of the workpiece extend on planes that are generally parallel to an arm that receives the workpiece.

The first robot positions the vertically-oriented workpiece on a shuttle, and a second robot is configured to separately clamp the workpieces in their vertical directions, as received from a shuttle associated with a second rotating carousel conveyor, and to reorient the workpieces in a horizontal position for positioning on the transfer conveyor in a position occupied by a workpiece, downstream of the position occupied by the workpiece at which the first immobilization of the robot receives the workpieces for loading to the first rotating carousel conveyor.

The conventional devices have drawbacks, however: in fact a non-optimal, imprecise and non-repeatable positioning is encountered of the various workpieces, which are initially identical to each other within the tolerance intervals, and of workpieces already worked in subsequent machining operations; therefore, for the same workpiece, non-identical positionings on the mountings can be obtained, which entails inaccuracies in the machining operations that are carried out.

The aim of the present invention is to solve the above mentioned technical problems and eliminate the drawbacks in the cited known art by devising a machining center that makes it possible to ensure that the parts or the profiles to be worked and which have been worked are always in the same position with respect to previously-known reference points, to guarantee stability during movements of the basket, and to facilitate the picking up of said worked parts or profiles.

Within this aim, an object of the invention is to provide a machining center that makes it possible to optimize the storage capacity of the loading basket and of the unloading basket.

Another object is to obtain a machining center that can accommodate placements that are adapted to always bring parts or profiles to be worked and which have been worked, even if mutually different, to the same position.

Another object is to obtain a machining center that is also compatible with the usual and conventional devices for mounting on a clamp parts or profiles to be worked or which have been worked, which is structurally simple and of low cost and which can be made with the usual conventional plants.

This aim and these and other objects which will become better apparent hereinafter are achieved by a machining center equipped with a device for mounting on a clamp parts or profiles to be worked or which have been worked, which has a supporting frame for supporting a turntable with two or more stepped positions or placements or workstations, a loading basket and an unloading basket, and which comprises a robot, anthropomorphic on the wrist, for the loading/unloading of said parts or profiles to be worked and of said parts or profiles which have been worked from said loading basket to said unloading basket with multiple receptacles, characterized in that said robot is configured to remove or to associate, with each one of said two or more stepped positions or placements or workstations, said parts or said profiles to be worked and which have been worked at a plurality of adapted fixed RPS or reference points and mobile mechanical components, according to a single positioning that is adapted to allow access by machining devices to any zone in the space of said parts or of said profiles to be worked by modifying only the condition that said two or more stepped positions or placements or workstations are in, said fixed reference points and said mobile mechanical components being adapted to achieve the leveling-off of said parts or of said profiles to be worked according to a three-dimensional Cartesian reference system.

Further characteristics and advantages of the invention will become better apparent from the detailed description of a particular, but not exclusive, embodiment which is illustrated by way of non-limiting example in the accompanying drawings wherein.

In the embodiments illustrated below, the individual characteristics shown in relation to specific examples may in reality be interchanged with other, different characteristics, existing in other embodiments.

With reference to the figures, the reference numeral 1 designates a machining center with a supporting structure or frame 2, made of electrowelded metal structural work, on which is fixed a turntable 3 with multiple stepped positions or placements or workstations 4 for the mounting of parts to be worked, such as profiles to be worked 5 or which have been worked 6.

In the specific embodiment shown, there is a turntable 3, which can be of the type for example with four or eight stepped positions or placements or workstations, which is equipped for example with three stations for machining and one station for loading/unloading the profiles to be worked 5 and which have been worked 6.

Figure 1:
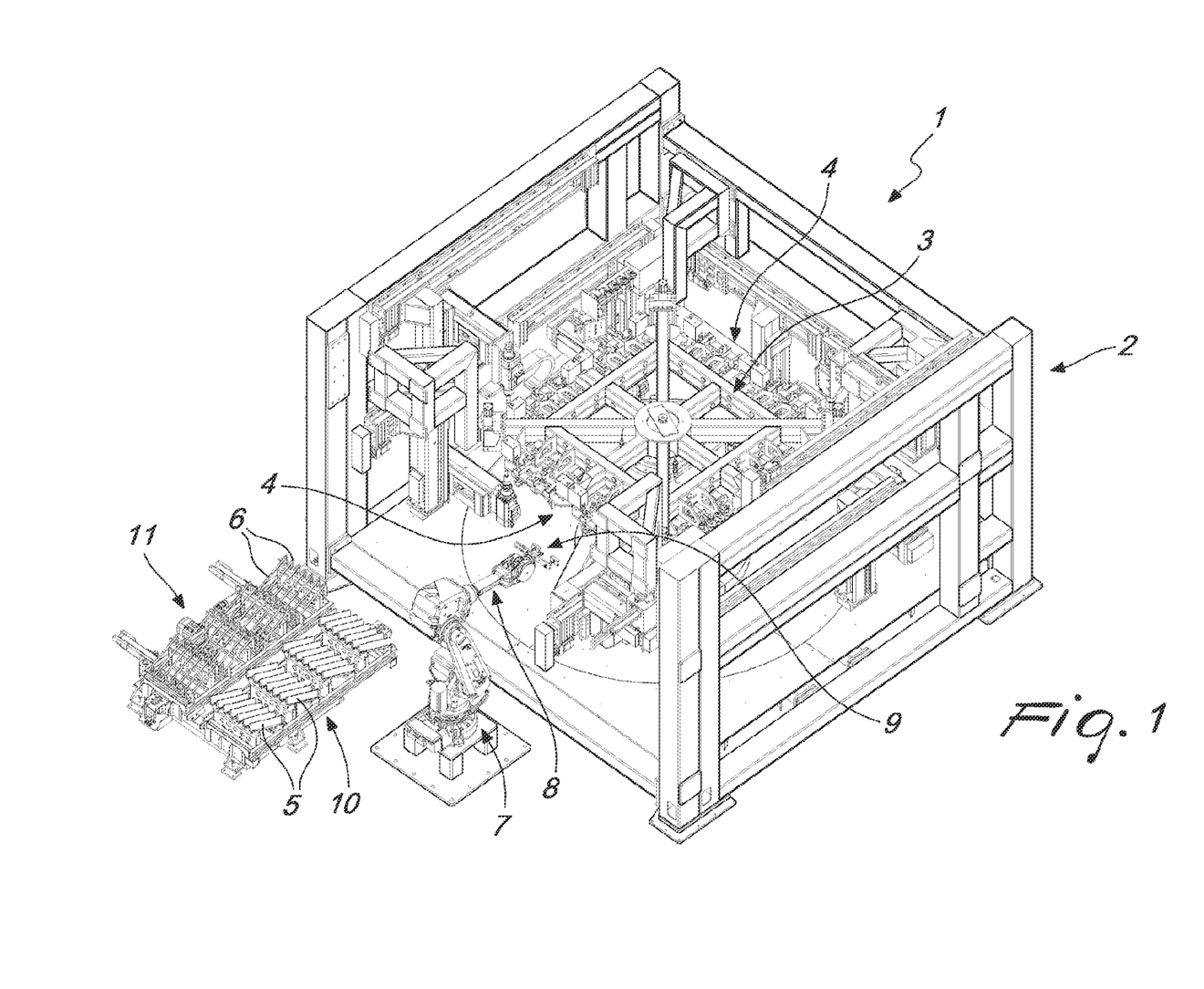
FIG. 1 shows a machining center according to the invention, including a robot, a loading basket and an unloading basket.
Figure 2:
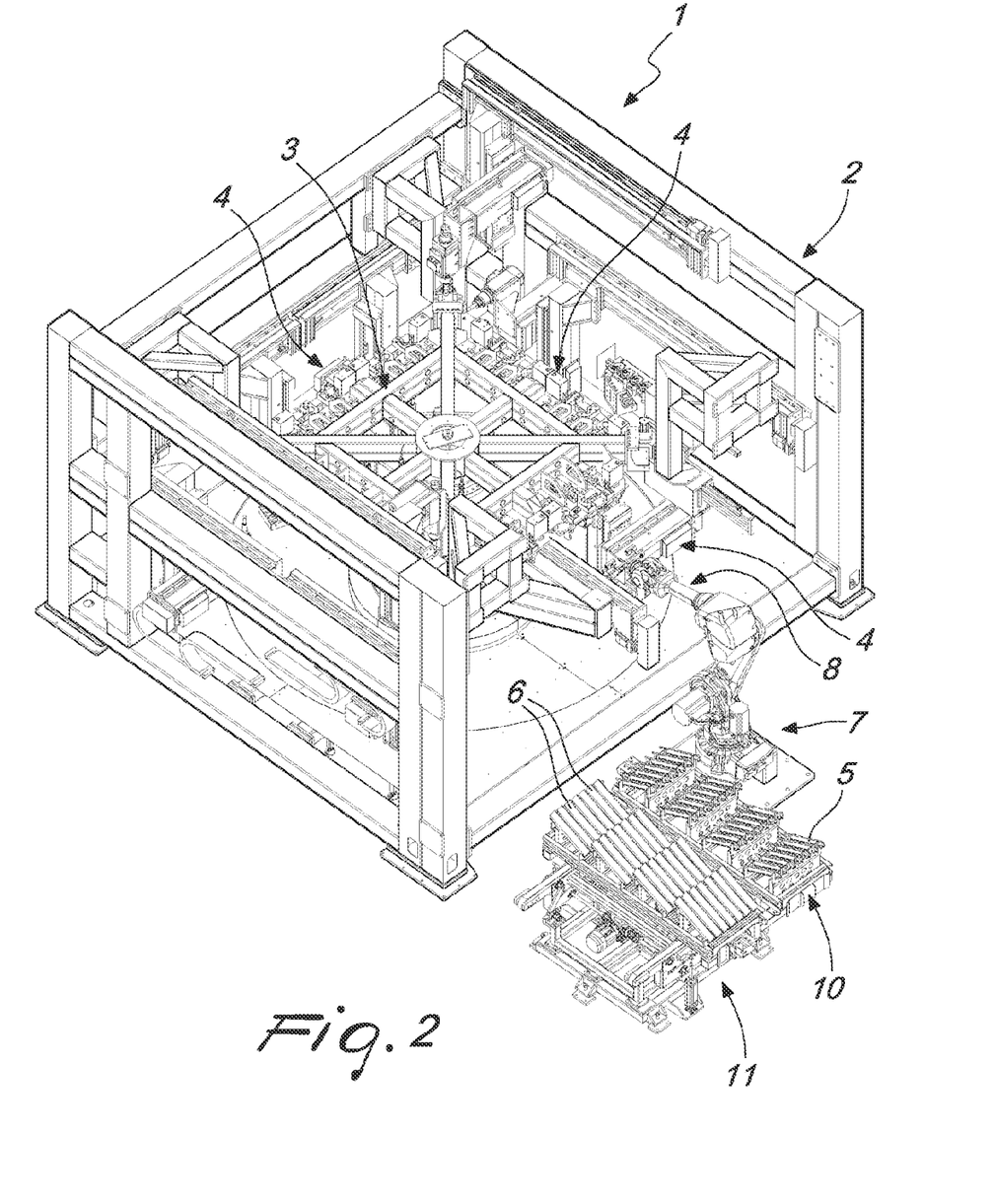
FIG. 2 is a view, similar to the previous one, of the robot after positioning a profile to be worked in a stepped position or placement or workstation.
Figure 3:
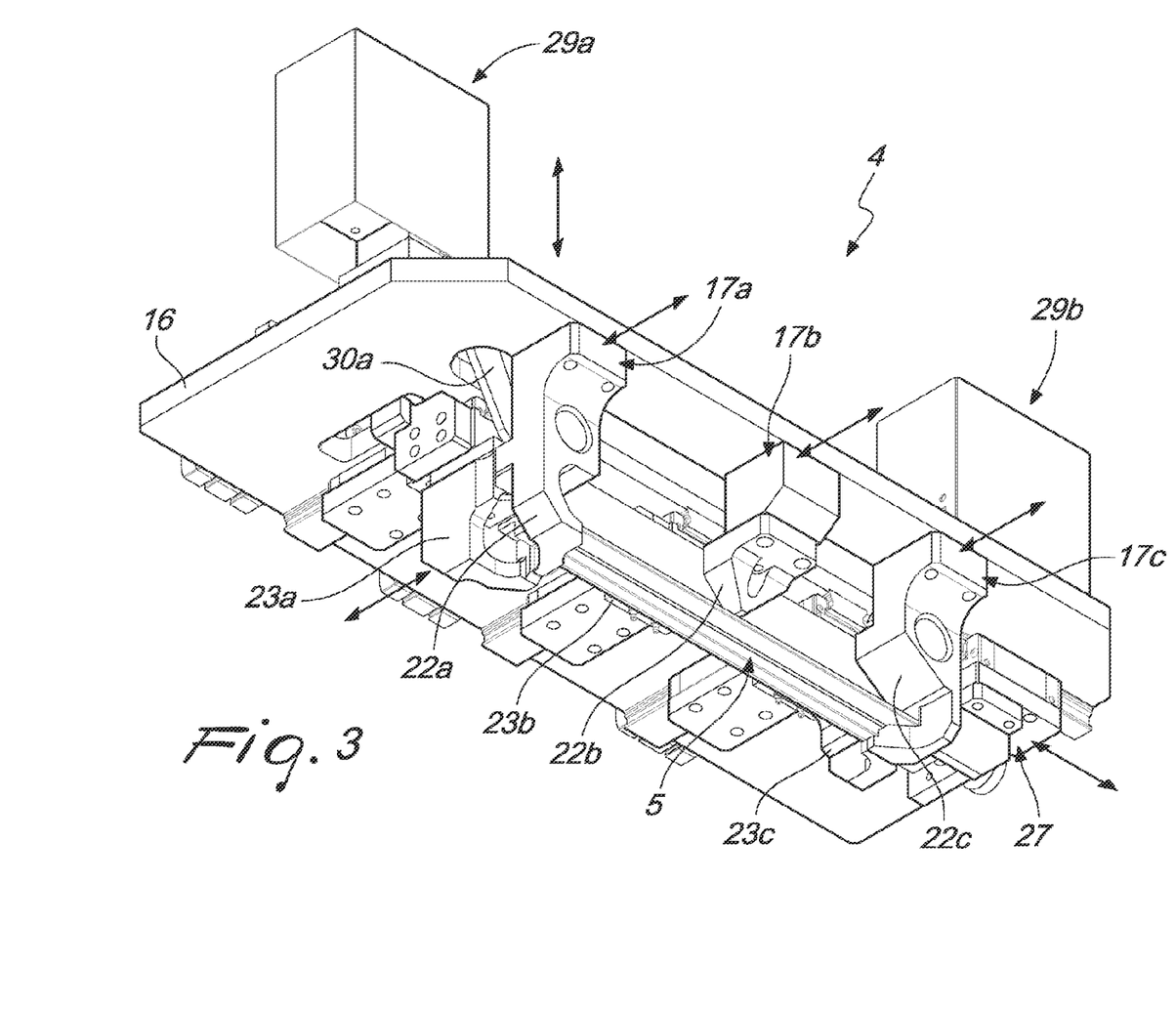
FIG. 3 is a perspective view from below of a stepped position or placement or workstation in which, for the sake of clarity, only the profile to be worked has been positioned inside it.
Figure 4:
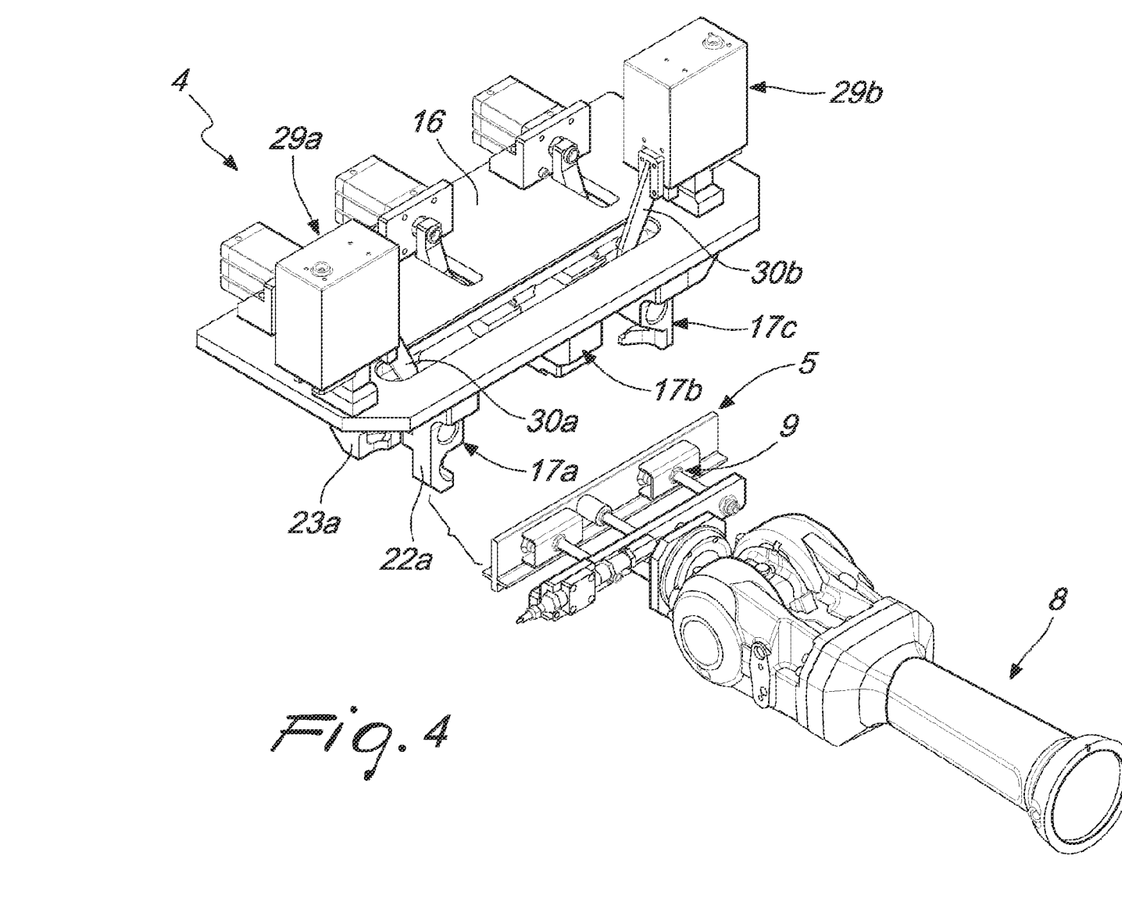
FIGS. 4 and 5 are a perspective view and a side view of a preliminary step before the insertion of the profile to be worked in the stepped position or placement or workstation.
Figure 5:
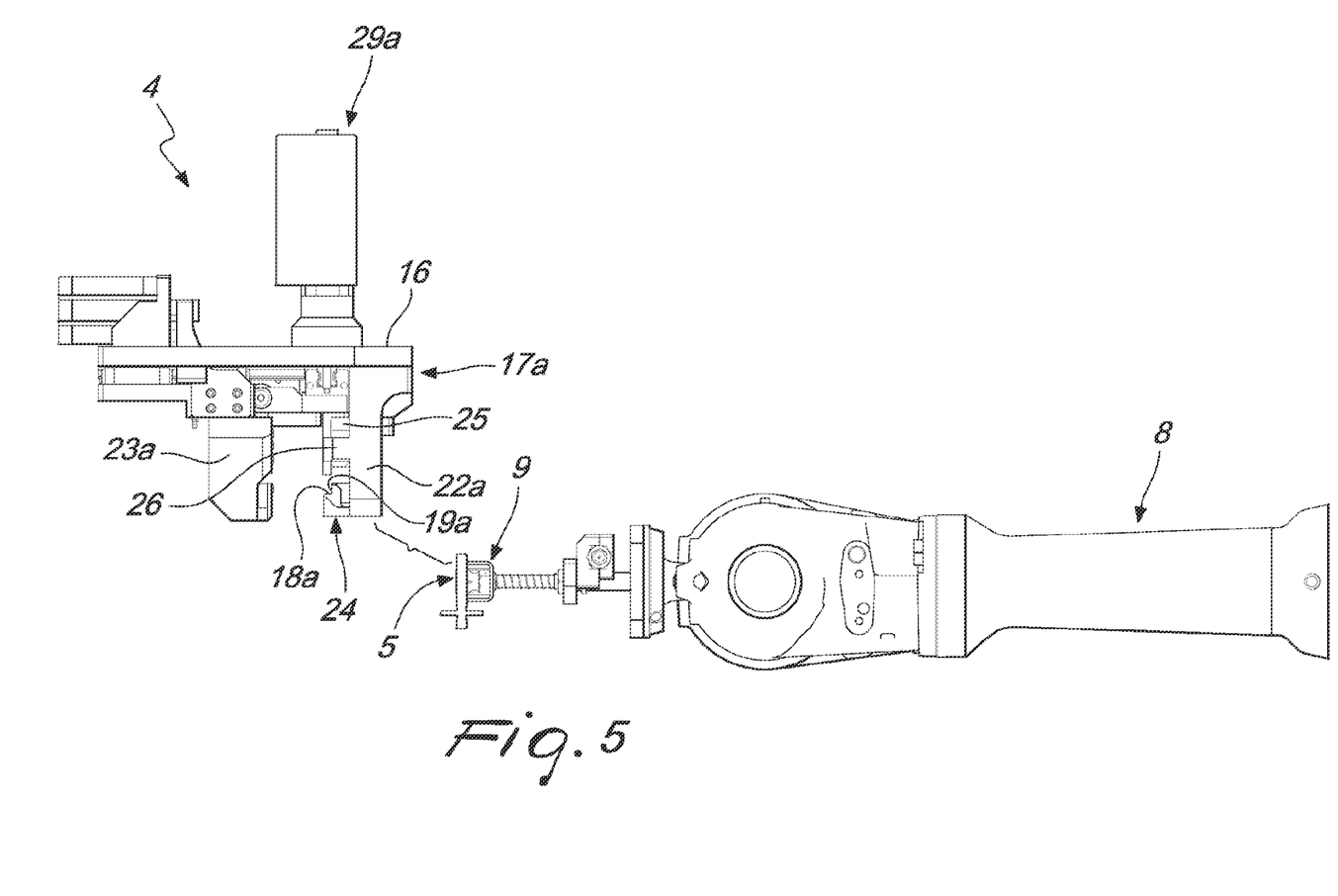
Figures 6, 7:
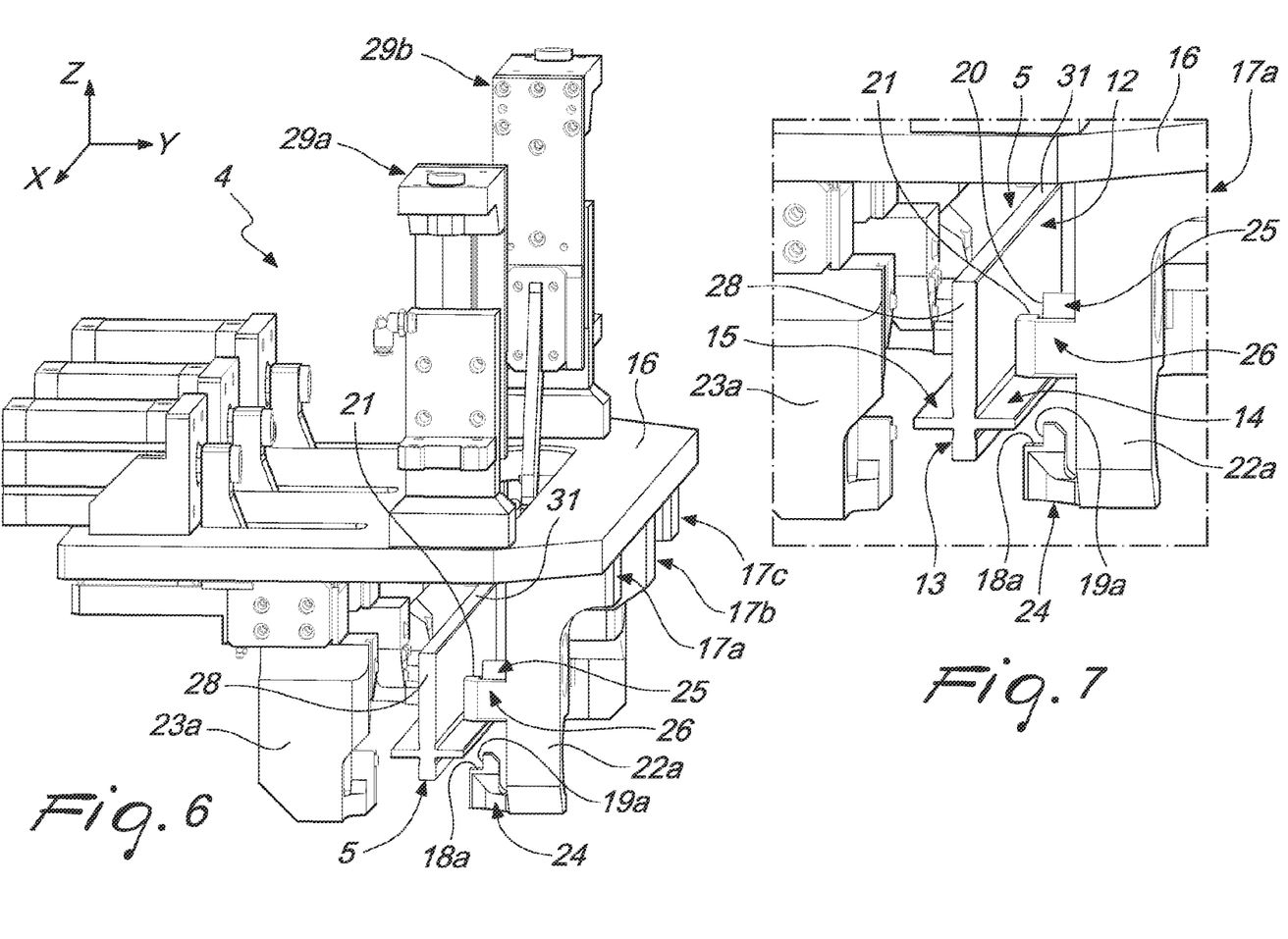
FIG. 6 is a perspective view of a stepped position or placement or workstation in the step of inserting the profile to be worked.
FIG. 7 shows a detail of FIG. 6.
Figure 8:
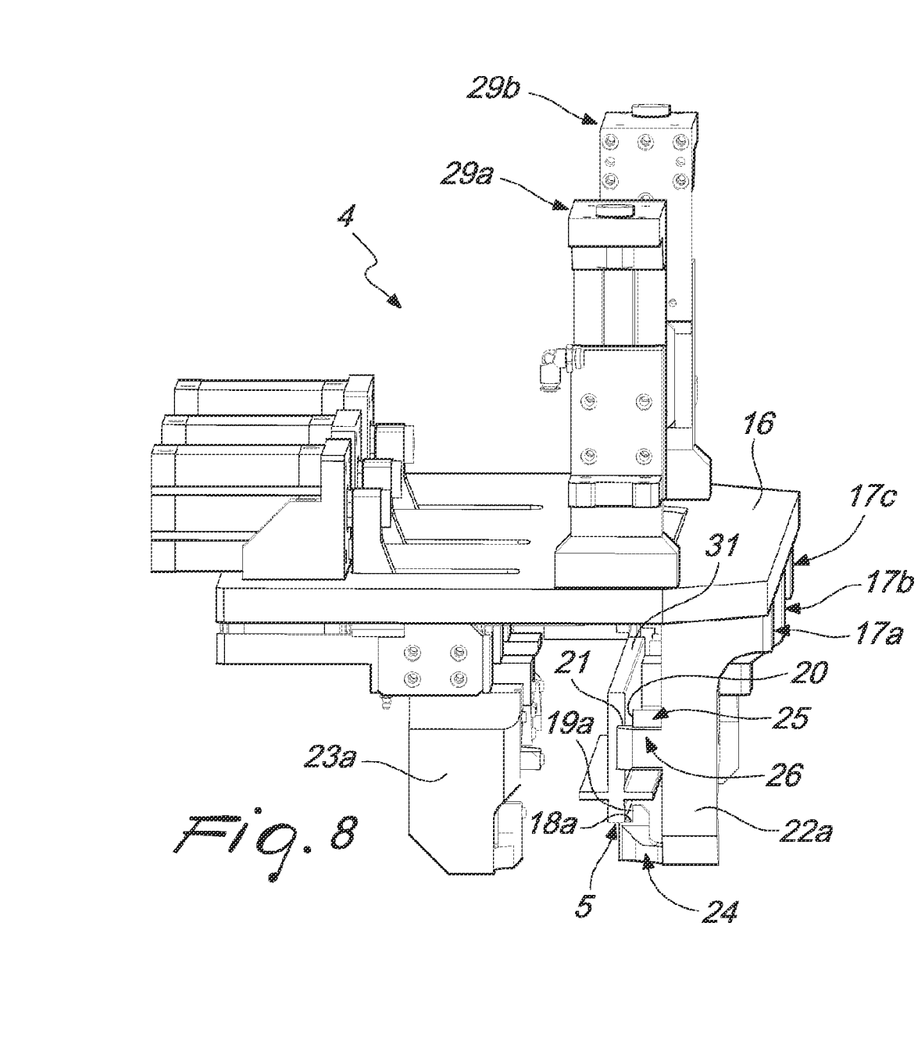
FIG. 8 is a perspective view of a stepped position or placement or workstation in the step of placing the profile to be worked on the lower fixed reference points.
Figure 9:
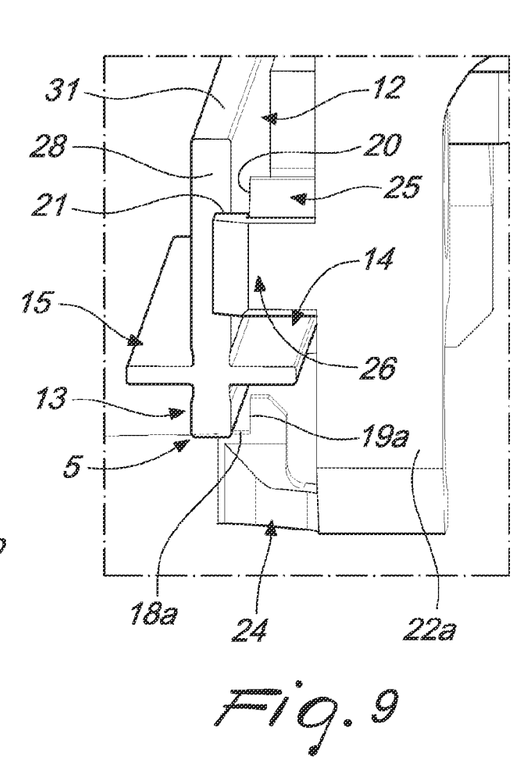
FIG. 9 shows a detail of FIG. 8.
Figure 10:
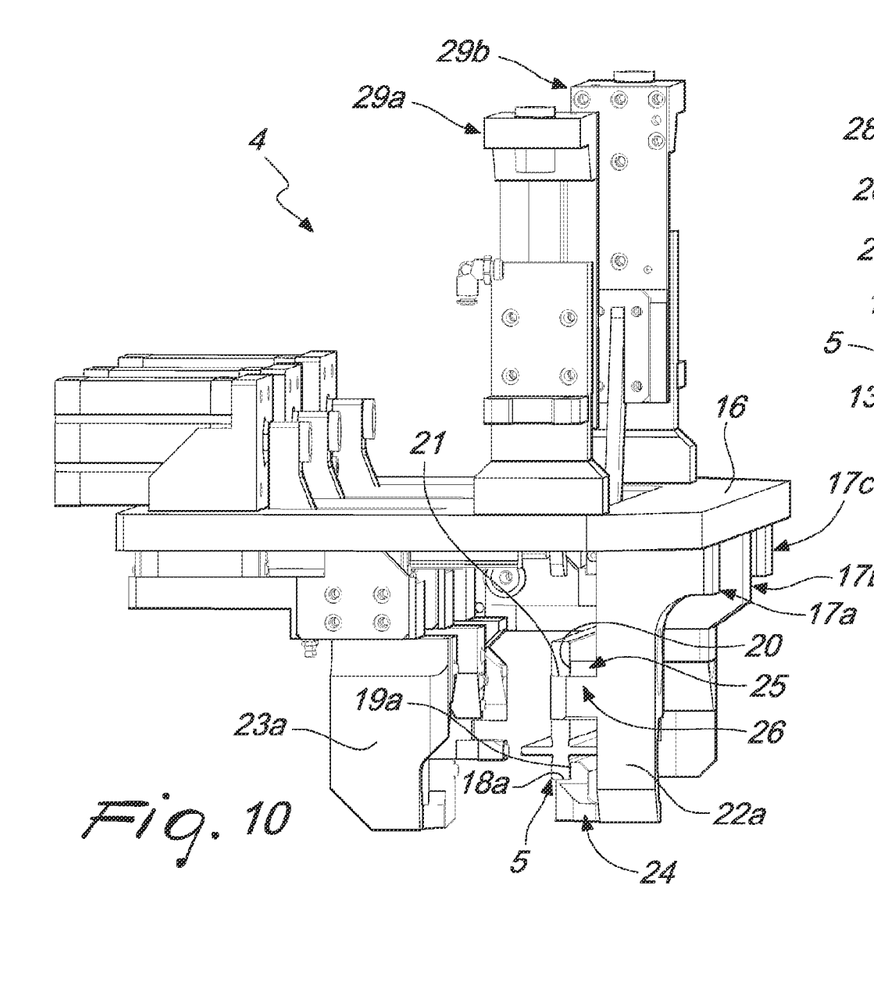
FIG. 10 is a perspective view of a stepped position or placement or workstation in the step of placing the profile to be worked on some front fixed reference points.
Figure 11:
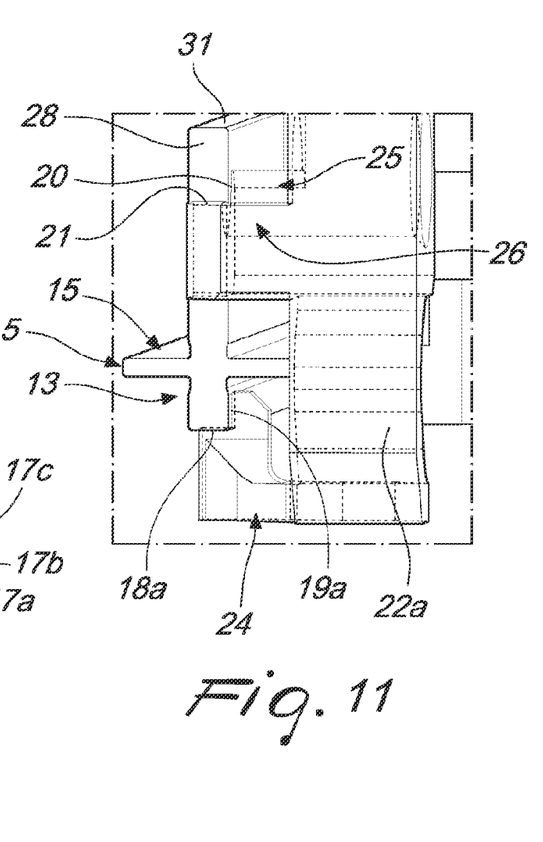
FIG. 11 shows a detail of FIG. 10.

The machining center comprises a robot 7, anthropomorphic on the wrist, which is adapted to carry out the operation of loading/unloading the parts or the profiles to be worked 5 and which have been worked 6, a grip hand 8 being mounted on the robot 7 which is provided with suckers or pneumatic grippers 9, the function of which is to pick up the profile to be worked 5 from a loading basket 10, position it in a desired stepped position or placement or workstation, exit from the stepped position or placement or workstation in order to allow the turntable 3 to rotate, reenter to pick up the worked profile 6, and deposit it in an unloading basket 11.

In order to optimize the storage capacity of the loading baskets and unloading baskets 10, 11, ensure that the profiles to be worked 5 and which have been worked 6 are always in the same position, guarantee stability during the movements of the basket 10, 11 and facilitate the picking up, the profiles to be worked and which have been worked 5, 6 are preferably presented inclined on two different planes, to take advantage of propping by gravity.

In order to comply with these objectives, for each profile to be worked and which has been worked 5, 6 six different fixed reference points have been defined, which are also known as RPS (Reference Positioning System) points, and the corresponding leveling-off pushers are actuated by mobile pressers or mobile jaws, which make it possible to constrain the profile to be worked or which has been worked 5, 6 in all directions.

The position of the RPS points has been carefully studied to comply with the set objectives and in order to allow machining with the machine tools required by the profile to be worked or which has been worked 5, 6.

In the particular example of embodiment, the profile to be worked 5 has, in cross-section, the shape of an inverted cross, illustrated by way of example and without limitation, with the clarification that this is one of the possible shape structures that the profile to be worked 5 can assume.

The latter therefore defines a vertical wing, divided into a larger upper vertical wing 12 and a smaller lower vertical wing 13, intersected by a horizontal wing, divided into an anterior lateral wing 14 and a posterior lateral wing 15.

A peculiarity of the stepped positions or of the placements or of the workstations is the positioning of the profiles to be worked or which have been worked 5, 6.

The RPS points are positioned in a plate 16, which is integral with the turntable 3, and are adapted to interact with six mobile mechanical components which are capable of positioning the parts or the profiles to be worked 5 in the above mentioned six different reference points.

The reference points and the mobile mechanical components are therefore designed to support and clamp with precision, enable the insertion and the unloading of the profiles to be worked and which have been worked 5, 6, and permit the machining operations and measurements necessary.

In all the stepped positions or placements or workstations 4, the profiles to be worked 5 are positioned initially below a conveniently shaped surface, such as a plate 16, on which the fixed and mobile mountings are assembled.

This contrivance makes it possible for the inevitable swarf deriving from the machining operations to fall to the ground where they are collected by a conveyor system, thus ensuring the maximum cleanliness of the operational area, plus it further enables the loading of the profiles to be worked 5 from below upward.

In order to clamp the profile to be worked or which has been worked 5, 6 it is necessary to constrain its six faces.

The fixed RPS are therefore reference or support points for the grip hand 8 of the robot 7 which is holding the profile to be worked or which has been worked 5, 6, and their purpose is to always have a fixed "zero" reference.

Initially the profile to be worked 5 is inserted, by way of said robot 7, in a zone arranged below the plate 16 at a zone defined in the interspace between first clamps 17a, 17b, 17c, initially open, and the corresponding mobile rear jaws 23a, 23b, 23c; thus the positioning of the profile to be worked 5 is enabled between the first clamps 17a, 17b, 17c and the corresponding mobile rear jaws 23a, 23b, 23 which are arranged below the plate 16.

This plate is provided with six fixed RPS or reference points, respectively to the right, in the center and to the left of the placement, and their position does not permit, as noted, the frontal loading of the profile to be worked 5 in the stepped position or placement or workstation 4, but from below.

So there is a pair of first, lower, fixed reference points 18a, 18b, a pair of second, front, fixed reference points 19a, 19b and a third, front, fixed reference point 20, and a fourth, lateral, fixed reference point 21, protruding from the fixed front jaws 22a, 22b, 22c of the first clamps 17a, 17b, 17c.

The fixed front jaws 22a, 22b, 22c are facing toward mobile rear jaws 23a, 23b, 23c.

The shape structure and the arrangement of the first, second and/or the third and fourth reference points depend on the shape structure of the profiles to be worked and which have been worked 5, 6; in the particular embodiment, the first, lower, fixed reference points 18a, 18b or RPS and the second, front, fixed reference points 19a, 19b or RPS are defined at the terminal end, conveniently L-shaped, of a first tab 24 which protrudes frontally from the fixed front jaw 22a, 22b, 22c proximate to their lower end.

The third, front, fixed reference point 20 or RPS on the other hand is defined at the terminal end of a second tab 25, conveniently shaped, which protrudes frontally from the first fixed clamp 17b proximate to its upper end.

The fourth, lateral, fixed reference point 21 or RPS is defined at the terminal end, directed perpendicularly to the first tab and the second tab 24, 25, of a third tab 26 which protrudes frontally from the fixed front jaw 22a proximate to a zone adjacent to the upper end.

The first, lower, fixed reference points 18a, 18b or RPS are the reference for the Z axis, while the second and/or the third, front, reference points 19a, 19b, 20 serve as the reference in the Y direction, and the fourth, lateral, fixed reference point 21 or RPS serves as the reference in the X direction.

The grip hand 8 of the robot 7 is adapted to place the profile to be worked 5 on the first, lower, fixed reference points 18a, 18b in order to carry out the leveling-off on the Z axis; subsequently the grip hand 8 of the robot 7 is adapted to place the profile to be worked 5 on the second and/or the third, front, reference points 19a, 19b, 20 in order to obtain the leveling-off on the Y axis.

Figures 12, 13:
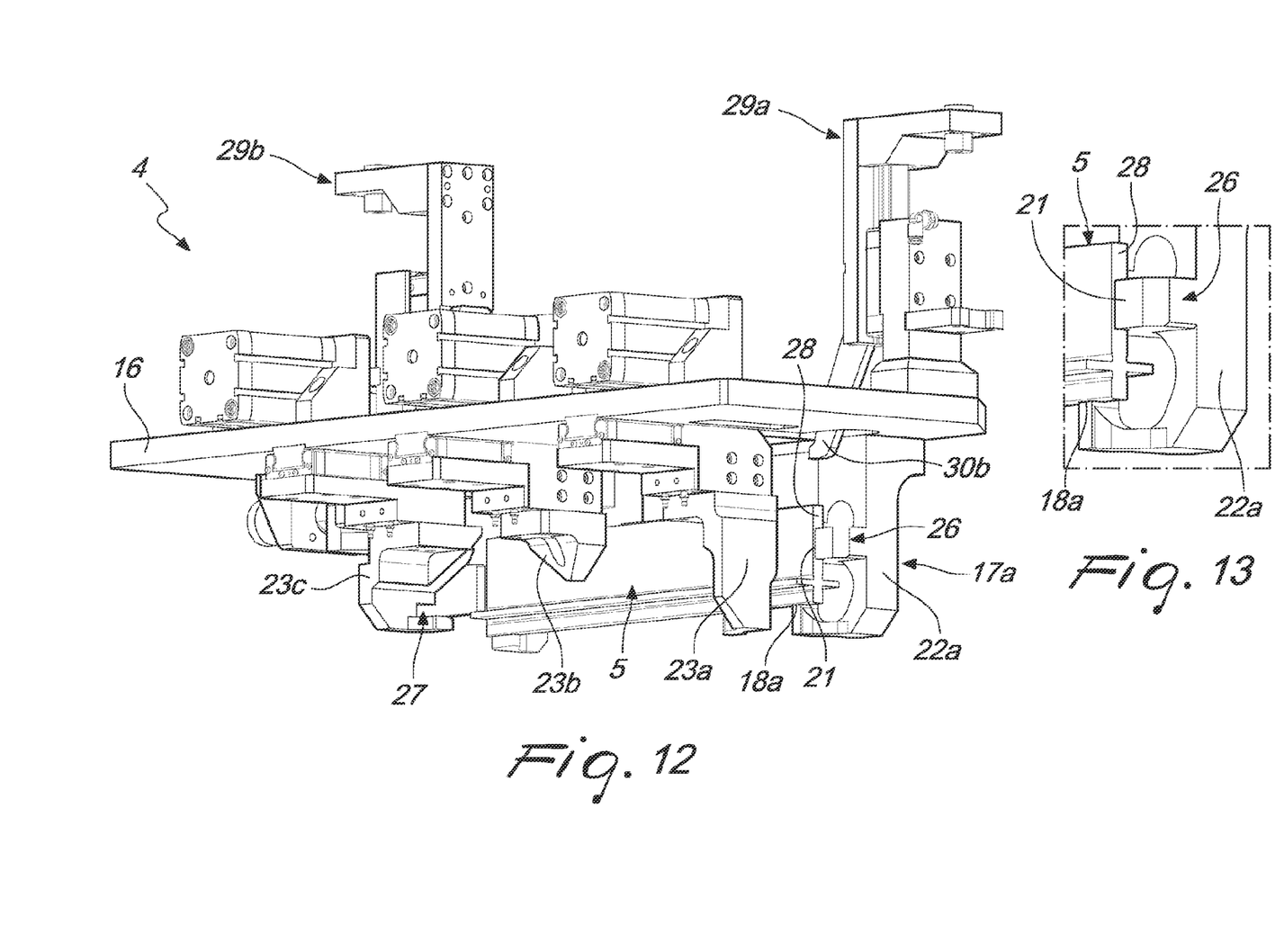
FIG. 12 is a perspective view of a stepped position or placement or workstation in the step of placing the profile to be worked on a lateral fixed reference point.
FIG. 13 shows a detail of FIG. 12.

The grip hand 8 of the robot 7 is furthermore adapted to place the profile to be worked 5 on the fourth, lateral, fixed reference point 21 in order to carry out the leveling-off on the X axis.

Figure 14:
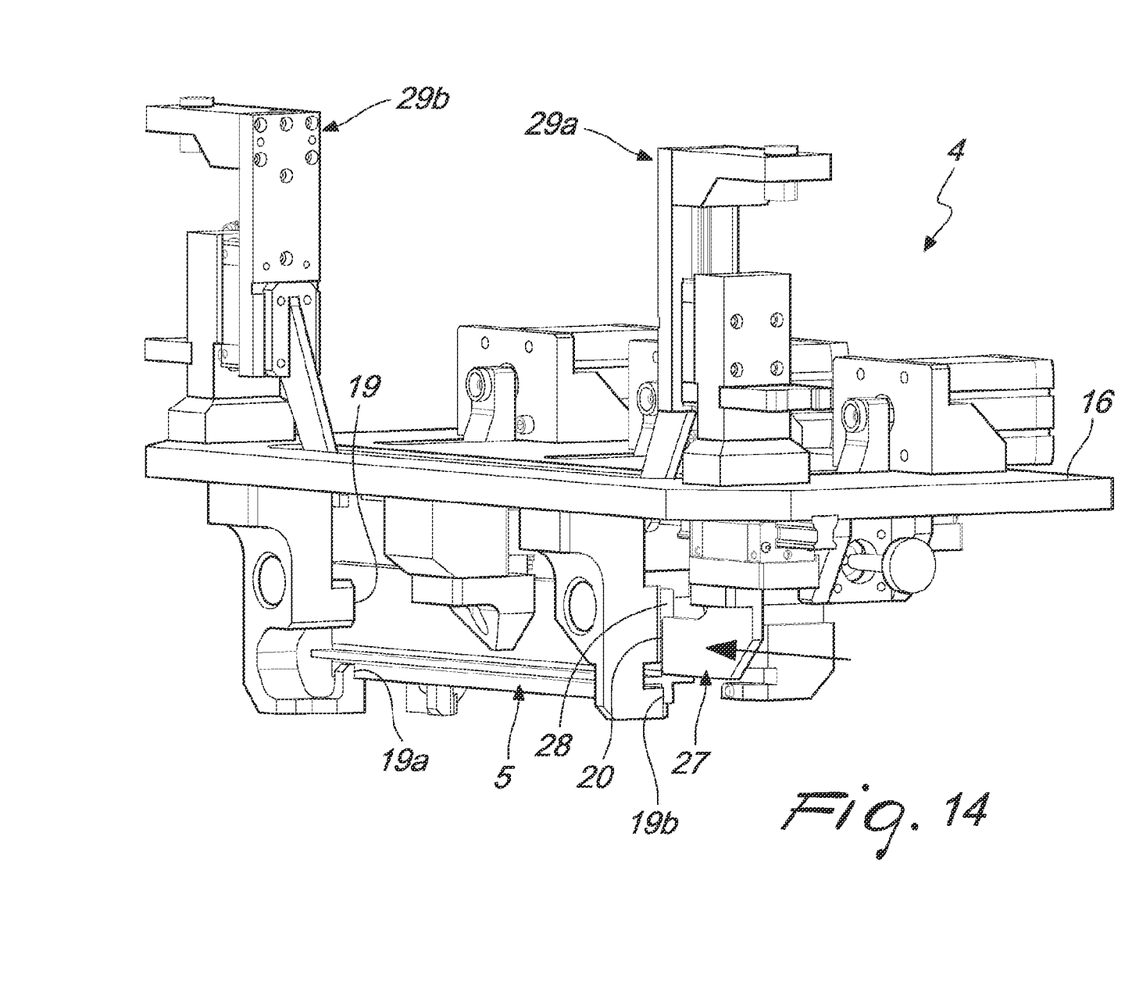
FIG. 14 is a perspective view of a stepped position or placement or workstation in the step of closing the profile to be worked on a lateral fixed reference point by way of a lateral first mobile presser.
Figure 15:
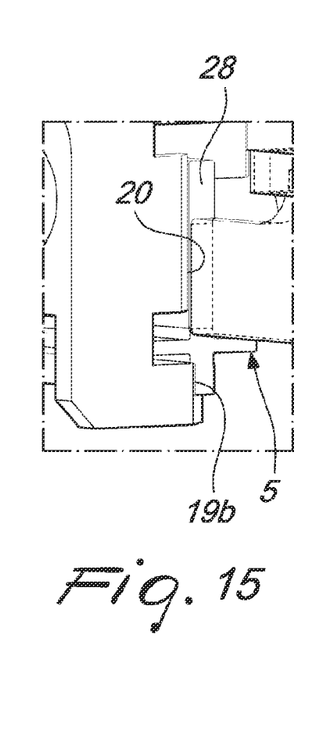
FIG. 15 shows a detail of FIG. 10.

The machining center further comprises a first mobile presser 27 which is adapted to force the lateral closure of the profile to be worked 5, the first mobile presser 27 being associated with the plate 16 and having a terminal end that rests against and interacts with the lateral surface 28 of the profile to be worked 5.

Figure 16:
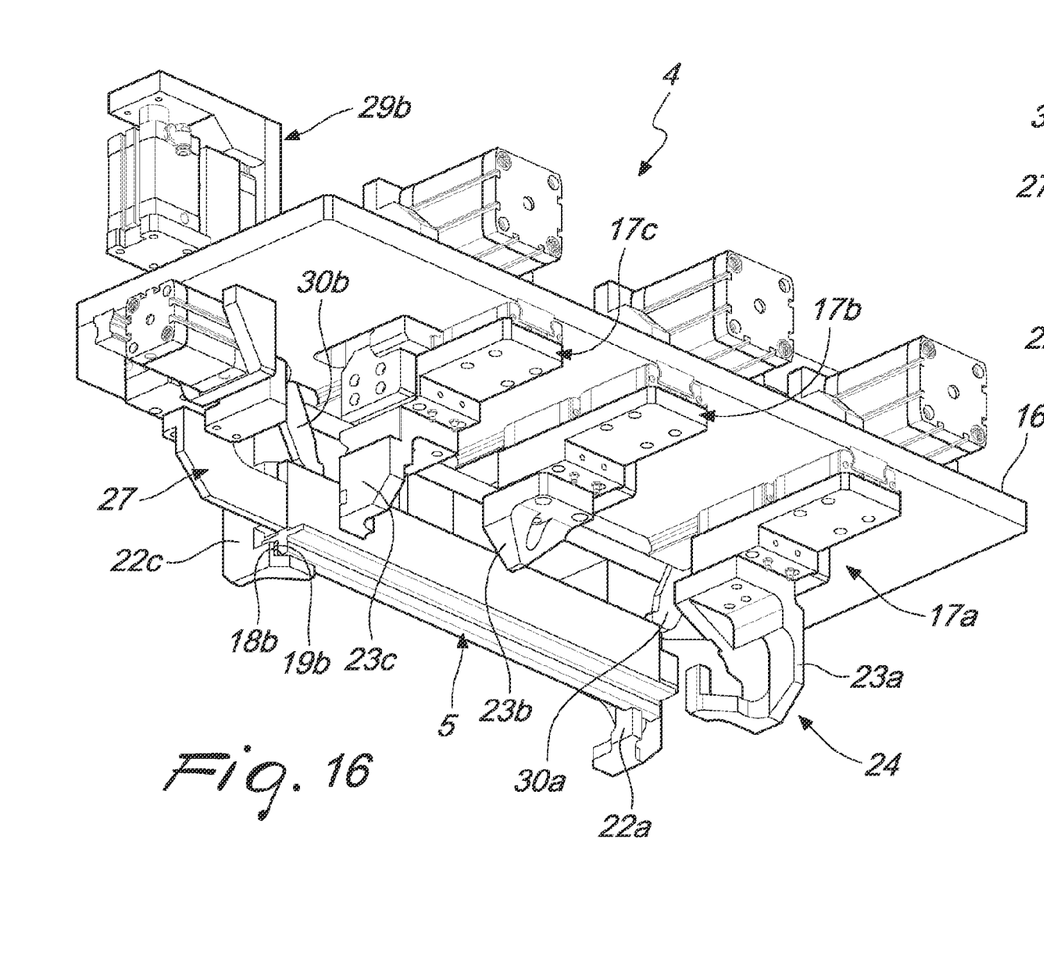
FIG. 16 is a perspective view from below of a stepped position or placement or workstation in the step of closing the profile to be worked on the lower fixed reference points by way of upper mobile pressers.
Figure 17:
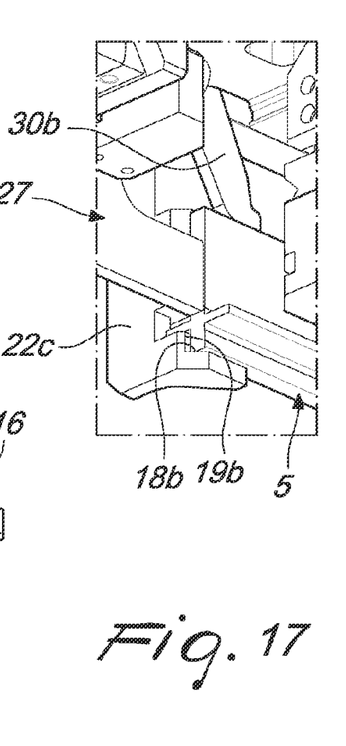
FIG. 17 shows a detail of FIG. 10.
Figure 18:
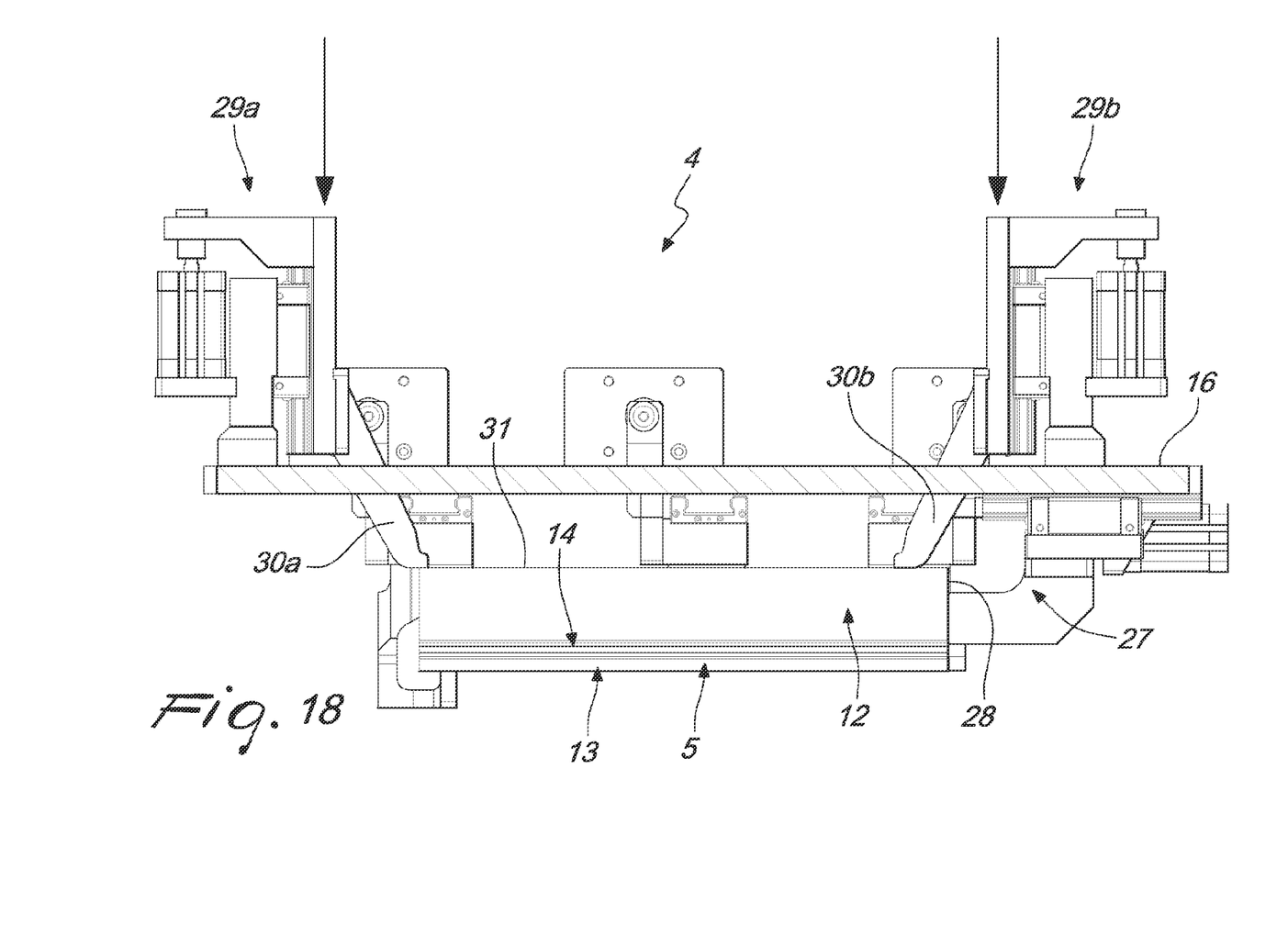
FIG. 18 is a front elevation view of the stepped position or placement or workstation in FIG. 16.

The machining center further comprises a pair of second mobile pressers 29a, 29b which are adapted to force the upper closure of the profile to be worked 5, the pair of second mobile pressers 29a, 29b being associated with the plate 16 and being provided with arms 30a, 30b which protrude in a zone that lies above the upper lateral surface 31 of the profile to be worked 5.

Figures 19, 20:
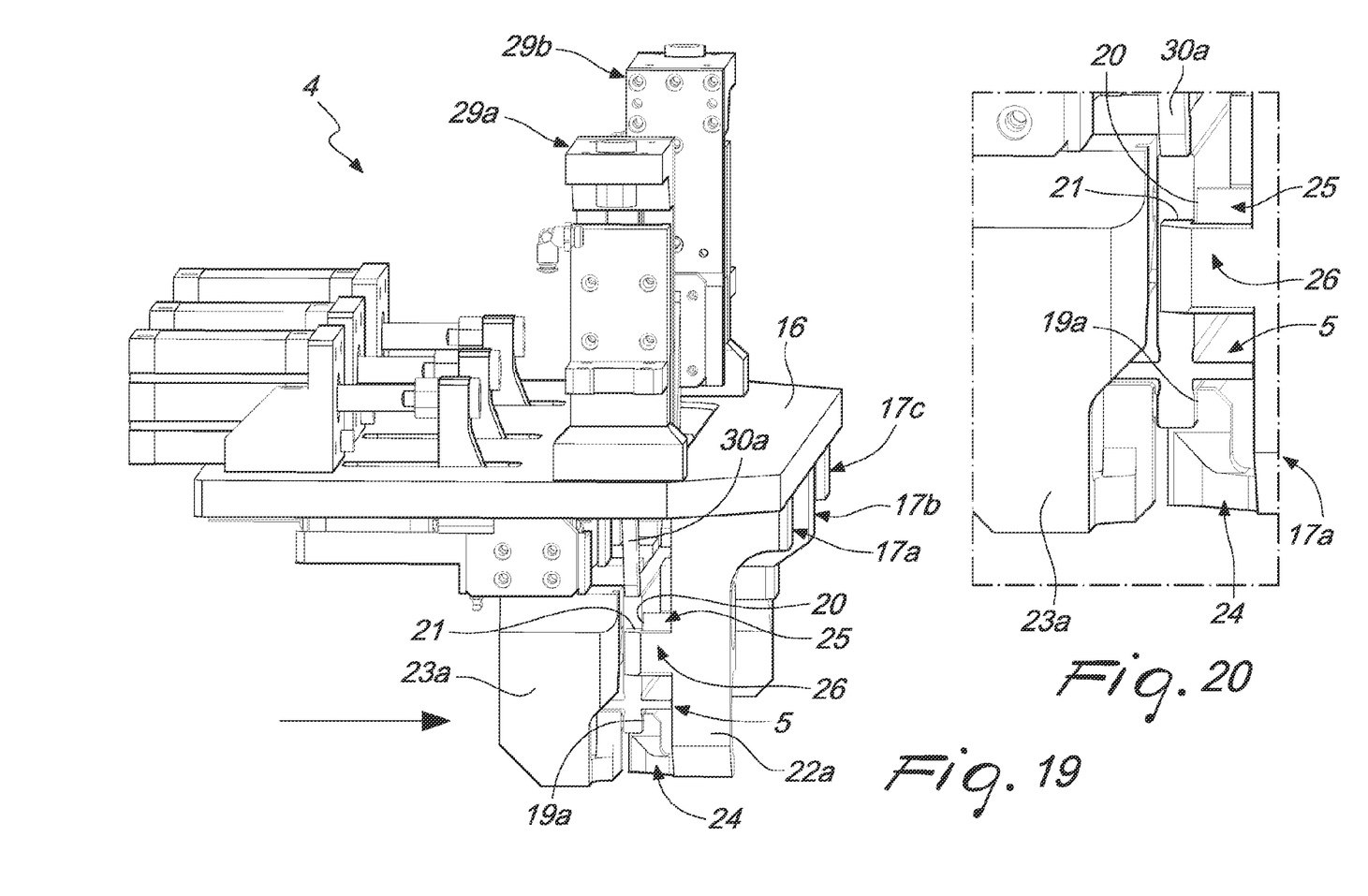
FIG. 19 is a perspective view of a stepped position or placement or workstation in the step of closing the profile to be worked on frontal reference points by way of mobile rear jaws.
FIG. 20 shows a detail of FIG. 19.

The second mobile rear jaws 23a, 23b, 23c of the first clamps 17a, 17b, 17c constitute a frontal reference, their movement being adapted to force the frontal closure of the profile to be worked 5 so as to ensure the perfect mounting of that profile.

It should be noted that the grip hand 8 of the robot 7, and the loading baskets and unloading baskets 10, 11, and the stepped positions or the placements or the workstations 4 are all designed to accommodate profiles to be worked and which have been worked 5, 6 which even have a different shape from the shape illustrated, with the addition, where necessary, of fixed and/or mobile parts that must be compatible with the encumbrances necessary for execution of machining operations on the parts, such as for example the space occupation of spindles and of milling cutters.

Once the profile to be worked 5 has undergone the successive machining operations required, the mobile mechanical components are opened in order to allow the picking up of the worked profile 6 and the insertion of the new profile to be worked 5.

The loading basket and the unloading basket 10, 11 can contain a finite number of profiles to be worked or which have been worked 5, 6 and when the robot 7 has picked them all up it will be necessary to substitute it.

Thus it has been found that the invention fully achieves the intended aim and objects, a machining center having been obtained that makes it possible to ensure that the profiles to be worked and which have been worked are always in the same position, to guarantee stability during movements of the basket, and to facilitate the picking up of the worked profiles.

Furthermore the machining center makes it possible to optimize the storage capacity of the loading basket and the unloading basket, it being possible to use profiles to be worked and which have been worked, even if mutually different, to the same position.

Naturally the materials used as well as the dimensions of the individual components of the invention may be more relevant according to specific requirements.

The characteristics indicated above as advantageous, convenient or the like, may also be missing or be substituted by equivalent characteristics.

The disclosures in Italian Patent Application No. 102019000002059 from which this application claims priority are incorporated herein by reference.

The invention claimed is:

1. A machining center comprising:
   a device for mounting on a clamp, parts or profiles, to be worked or which have been worked;
   a supporting frame for supporting a turntable with two or more stepped positions or placements or workstations;
   a loading basket and an unloading basket with multiple receptacles;
   a robot with an anthropomorphic wrist for the loading/unloading of said parts or profiles to be worked and of said parts or profiles which have been worked from said loading basket to said unloading basket,
   wherein said robot is configured to remove or to associate, with each one of said two or more stepped positions or placements or workstations, said parts or said profiles to be worked and which have been worked at a plurality of fixed RPS or fixed reference points and mobile mechanical components, according to a single positioning that is adapted to allow access by machining devices to any zone in a space wherein said parts or of said profiles to be worked are located, by modifying only a condition that said two or more stepped positions or placements or workstations are in,
   said fixed reference points and said mobile mechanical components being adapted to achieve a leveling-off of said parts or of said profiles to be worked according to a three-dimensional Cartesian reference system,
   wherein a grip hand is mounted on said robot wrist and is equipped with suckers or pneumatic grippers the function of which is to pick up said part or said profile to be worked from one of said loading baskets, position it in a desired stepped position or placement or workstation, exit from said stepped position or said placement or said workstation in order to allow the rotation of said turntable, and reenter in order to pick up said worked part or profile and set it down in one of said unloading baskets, said grip hand is configured to remove or to associate, with each one of said two or more stepped positions or placements or workstations, said parts or said profiles to be worked and which have been worked at said reference points by way of said mobile mechanical components, said reference points and said mobile mechanical components being adapted to make it possible to support and clamp, enable the insertion and the unloading, and enable the necessary machining operations and measurements, of said parts or said profiles to be worked and which have been worked in all directions, wherein said reference points are positioned in a plate which is integral with said turntable, and are adapted to interact with said mobile mechanical components which are capable of positioning said parts or said profiles to be worked in said fixed reference points, wherein said plate has a pair of first, lower, fixed reference points, a pair of second, front, fixed reference points and a third, front, fixed reference point, and a fourth, lateral, fixed reference point, said second, front, fixed reference points and said third, front, fixed reference point protruding from fixed front jaws of said first clamps, said fixed front jaws facing toward mobile rear jaws.

2. The machining center according to claim 1, wherein said grip hand positions said parts or said profiles to be worked initially in a zone arranged below said plate at a zone defined in an interspace between first clamps, initially open, said plate having six fixed reference points, respectively to the right, in the center and to the left of said stepped position or placement or workstation, their position not permitting a frontal loading of said part or said profile to be worked in said stepped position or placement or workstation.

3. The machining center according to claim 1, wherein said first, lower, fixed reference points and said second, front, fixed reference points are defined at the terminal end, conveniently L-shaped, of a first tab which protrudes frontally from said fixed front jaw proximate to its lower end, said third, front, fixed reference point being defined at the terminal end of a second tab, conveniently shaped, which protrudes frontally from said fixed first clamp proximate to its upper end, said fourth, lateral, fixed reference point being defined at the terminal end, directed perpendicularly to said first tab and said second tab, of a third tab which protrudes frontally from said fixed front jaw proximate to a zone adjacent to said upper end.

4. The machining center according to claim 1, wherein said grip hand is adapted to place said part or said profile to be worked on said first, lower, fixed reference points in order to carry out the leveling-off on a Z axis, said grip hand being further adapted to place said part or said profile to be worked on said second, and/or on said third, front, fixed reference points in order to obtain the leveling-off on a Y axis, said grip hand being further adapted to place said part or said profile to be worked on said fourth, lateral, fixed reference point in order to carry out the leveling-off on an X axis.

5. The machining center according to claim 1, further comprising a first mobile presser which is adapted to force a lateral closure on an X axis of said part or said profile to be worked, said first mobile presser being associated with the plate and having a terminal end that rests against and interacts with a lateral surface of said part or of said profile to be worked.

6. The machining center according to claim 5, further comprising a pair of second mobile pressers which are adapted to force an upper closure on an Y axis of said part or said profile to be worked, said pair of second mobile pressers being associated with said plate and being provided with arms which protrude in a zone that lies above an upper lateral surface of said part or said profile to be worked.

7. The machining center according to claim 1, wherein said mobile rear jaws of said first clamps constitute a frontal reference, a movement of said mobile rear jaws being adapted to force the frontal closure on the Z axis of said part or said profile to be worked so as to ensure a perfect mounting of said part or said profile to be worked.

* * * * *